(12) United States Patent
Egawa

(10) Patent No.: US 6,233,516 B1
(45) Date of Patent: May 15, 2001

(54) APPARATUS AND METHOD FOR CONTROLLING INTER-VEHICLE DISTANCE TO ANOTHER VEHICLE TRAVELING AHEAD OF AUTOMOTIVE VEHICLE EQUIPPED WITH THE APPARATUS AND METHOD

(75) Inventor: Kenichi Egawa, Tokyo (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/232,025

(22) Filed: Jan. 14, 1999

(30) Foreign Application Priority Data

Jan. 14, 1998 (JP) .................................................. 10-5577

(51) Int. Cl.$^7$ .................................. B60T 7/12; G06F 7/00
(52) U.S. Cl. .............................. 701/96; 701/93; 701/301; 342/70; 340/903; 340/904; 180/167; 180/169; 356/3
(58) Field of Search ................................ 701/93, 96, 300, 701/301; 180/167, 168, 169, 170; 340/903, 436, 904, 901, 902; 356/3.16, 5.05, 5.01, 3, 3.1; 250/559.38, 222.1; 342/70, 71, 69, 61, 73, 118; 702/97

(56) References Cited

U.S. PATENT DOCUMENTS

| | | | |
|---|---|---|---|
| 4,628,317 | * 12/1986 | Nishikawa et al. | 340/903 |
| 4,670,845 | * 6/1987 | Etoh | 701/396 |
| 4,716,298 | * 12/1987 | Etoh | 250/559.38 |
| 4,757,450 | * 7/1988 | Etoh | 701/93 |
| 4,786,164 | * 11/1988 | Kawata | 180/168 |
| 5,026,153 | * 6/1991 | Suzuki et al. | 180/167 |
| 5,053,979 | * 10/1991 | Etoh | 701/96 |
| 5,127,487 | 7/1992 | Yamamoto | 180/179 |
| 5,315,295 | 5/1994 | Fujii | 340/936 |
| 5,396,426 | 3/1995 | Hibino et al. | 364/426.04 |
| 5,400,864 | 3/1995 | Winner et al. | 180/169 |
| 5,444,346 | 8/1995 | Sudo et al. | 318/616 |
| 5,529,139 | * 6/1996 | Kurahashi et al. | 180/169 |
| 5,587,908 | * 12/1996 | Kajiwara | 701/96 |
| 5,675,518 | * 10/1997 | Kuroda et al. | 701/96 |
| 5,695,020 | 12/1997 | Nishimura | 180/169 |
| 5,710,565 | 1/1998 | Shirai et al. | 342/70 |
| 5,920,382 | * 7/1999 | Shimizu et al. | 340/903 |
| 6,154,168 | * 11/2000 | Egawa et al. | 342/71 |
| 6,161,073 | * 12/2000 | Tange et al. | 701/96 |

FOREIGN PATENT DOCUMENTS

| | | |
|---|---|---|
| 42 01 142 | 8/1992 | (DE) . |
| 44 07 082 | 9/1994 | (DE) . |
| 44 17 593 | 11/1994 | (DE) . |
| 6-8747 | 1/1994 | (JP) . |
| 7-223457 | 8/1995 | (JP) . |

* cited by examiner

Primary Examiner—Jacques H. Louis-Jacques
(74) Attorney, Agent, or Firm—Foley & Lardner

(57) ABSTRACT

In control apparatus and method for controlling an inter-vehicle distance to another vehicle traveling ahead of the vehicle, an inter-vehicle distance from the vehicle to another vehicle running on a traffic lane at the detected inter-vehicle distance from the vehicle is detected through an inter-vehicle distance detector; a follow-up running control for the vehicle is performed by a vehicular running controller such that the vehicle runs behind the other vehicle, maintaining a predetermined inter-vehicle distance to the other vehicle; and a vehicular velocity variation inhibit command is generated and outputted to the vehicular running controller to maintain a vehicular running state immediately before the inter-vehicle distance detector changes from a first state in which the inter-vehicle distance to the other vehicle is being detected into a second state in which the inter-vehicle distance becomes indetectable is continued for a duration of time until the vehicle passes the traffic lane by the inter-vehicle distance immediately before the inter-vehicle distance detector changes from the first state into the second state.

20 Claims, 5 Drawing Sheets

APPARATUS AND METHOD FOR CONTROLLING INTER-VEHICLE DISTANCE TO ANOTHER VEHICLE TRAVELING AHEAD OF AUTOMOTIVE VEHICLE EQUIPPED WITH THE APPARATUS AND METHOD

The contents of the Application No. Heisei 10-5577, with a filing date of Jan. 14, 1998 in Japan, are herein incorporated by reference.

BACKGROUND OF THE INVENTION a) Field of the Invention

The present invention relates to control apparatus and method for an automotive vehicle and, more particularly, relates to inter-vehicle distance control apparatus and method for controlling an inter-vehicle distance from the vehicle to another preceding vehicle traveling ahead of the vehicle, maintaining the inter-vehicle distance between the vehicle and the preceding vehicle at a determined distance value to follow up the preceding vehicle.

b) Description of the Related Art

A Japanese Patent Application First Publication No. Heisei 6-8747 published on Jan. 14, 1994 exemplifies a previously proposed vehicular inter-vehicle distance controlling apparatus.

In the previously proposed inter-vehicle distance controlling apparatus disclosed in the above-identified Japanese Patent Application Publication, a target vehicle speed is set, an actual inter-vehicle distance between the vehicle and another preceding vehicle traveling ahead of the vehicle is measured, and a target inter-vehicle distance to the other preceding vehicle is calculated according to the instantaneous vehicle speed.

When the calculated target inter-vehicle distance is larger (longer) than the actual inter-vehicle distance, a vehicular speed controller determines that the vehicle is too be approached to the other preceding vehicle and performs a deceleration control to decelerate the vehicle.

On the contrary, when the calculated target inter-vehicle distance is smaller (shorter) than the actual inter-vehicle distance, the vehicular speed controller determines that the vehicle is running at a safe position with respect to the other preceding vehicle and performs an acceleration control with an acceleration which is in accordance with a difference between the target vehicle speed and the actual vehicle speed.

Furthermore, when a right winker of the vehicle indicates that the vehicle is running at a right direction with respect to the width of the vehicle from an output signal of a winker switch and a steering angular displacement is equal to or in excess of a predetermined value, the vehicular speed controller recognizes that the vehicle is changing a traffic lane to another traffic lane in order to turn over the preceding vehicle and calculates the target inter-vehicle distance on the basis of the instantaneous vehicle speed. When the calculated target inter-vehicle distance is larger than the actual inter-vehicle distance detected by a radar unit which constitutes the inter-vehicle distance detector, the vehicular speed controller determines that the vehicle is too be approached to the other preceding vehicle and performs the deceleration control. When the target inter-vehicle distance is smaller (shorter) than the actual inter-vehicle distance, the controller determines that the vehicle is running at a safe distance with respect to the preceding vehicle so that the target vehicle velocity is incrementally corrected to perform the acceleration control.

SUMMARY OF THE INVENTION

However, in the previously proposed inter-vehicle distance controlling apparatus described in the BACKGROUND OF THE INVENTION, the acceleration control is performed when the target inter-vehicle distance based on the present vehicle velocity is shorter (smaller) than the actual inter-vehicle distance, the target vehicle speed is incrementally corrected to provide the target vehicle speed correction value upon the confirmation that the lane change is carried out, and the vehicle is accelerated up to the target vehicle speed correction value when the target inter-vehicle distance is still smaller than the actual inter-vehicle distance.

In addition, since the radar unit used to detect the inter-vehicle distance has a directivity, suppose, for example, a case where when the other preceding vehicle is running at the vehicle speed slower than the target vehicle speed and the (controlled) vehicle is running to follow up the preceding vehicle maintaining a predetermined inter-vehicle distance with respect to the preceding vehicle, the preceding vehicle is about to turn a corner having a smaller radius of turn (a more tight corner). At this time, if the radar unit cannot trap the preceding vehicle, the vehicle speed controller would determine that the preceding vehicle is not present and the actual inter-vehicle distance is infinite. In spite of the fact that the controlled vehicle is about to enter the tight corner, the controlled vehicle is transferred into the acceleration state so that a different sense of feeling is give to a driver of the controlled vehicle.

It is therefore an object of the present invention to provide control apparatus and method for an automotive vehicle which maintain a present vehicular running state during the run of the vehicle at an inter-vehicle distance immediately before an inter-vehicle distance detector becomes physically impossible to detect the preceding vehicle due to an outside of a preceding vehicle trapping range by the radar unit, the vehicle being run to follow up the preceding vehicle so as to prevent a different sense of feeling due to an unintentional acceleration against the vehicle from being given to the driver of the (controlled) vehicle.

The above-described object can be achieved by providing a control apparatus for an automotive vehicle, comprising: an inter-vehicle distance detector for detecting an inter-vehicle distance from the vehicle to another vehicle running on a traffic lane at the detected inter-vehicle distance from the vehicle; a vehicular running controller for performing a follow-up running control for the vehicle such that the vehicle runs behind the other vehicle, maintaining a predetermined inter-vehicle distance to the other vehicle; and a vehicular velocity variation inhibit command generator for generating and outputting a vehicular velocity variation inhibit command to the vehicular running controller to maintain a vehicular running state immediately before the inter-vehicle distance detector changes from a first state in which the inter-vehicle distance to the other vehicle is being detected into a second state in which the inter-vehicle distance becomes indetectable is continued for a duration of time until the vehicle passes the traffic lane by the inter-vehicle distance immediately before the inter-vehicle distance detector changes from the first state into the second state.

The above-described object can also be achieved by providing a control apparatus for an automotive vehicle, comprising: inter-vehicle distance detecting means for detecting an inter-vehicle distance from the vehicle to another vehicle running on a traffic lane at the detected inter-vehicle distance from the vehicle; vehicular running controlling means for performing a follow-up running control for the vehicle such that the vehicle runs behind the other vehicle, maintaining a predetermined inter-vehicle distance to the other vehicle; and vehicular velocity variation inhibit command generating means for generating and outputting a vehicular velocity variation inhibit command to the vehicular running controlling means to maintain a vehicular running state immediately before the inter-vehicle distance detecting means changes from a first state in which the inter-vehicle distance to the other vehicle is being detected into a second state in which the inter-vehicle distance becomes indetectable is continued for a duration of time until the vehicle passes the traffic lane by the inter-vehicle distance immediately before the inter-vehicle distance detecting means changes from the first state into the second state.

The above-described object can also be achieved by providing a control method for an automotive vehicle, comprising the steps of: detecting an inter-vehicle distance from the vehicle to another vehicle running on a traffic lane at the detected inter-vehicle distance from the vehicle through an inter-vehicle distance detector; performing a follow-up running control for the vehicle such that the vehicle runs behind the other vehicle, maintaining a predetermined inter-vehicle distance to the other vehicle; and generating a vehicular velocity variation inhibit command to maintain a vehicular running state immediately before the inter-vehicle distance detector changes from a first state in which the inter-vehicle distance to the other vehicle is being detected into a second state in which the inter-vehicle distance becomes indetectable is continued for a duration of time until the vehicle passes the traffic lane by the inter-vehicle distance immediately before the inter-vehicle distance detecting means changes from the first state into the second state.

BEST MODE FOR CARRYING OUT THE INVENTION

Reference will hereinafter be made to the drawings in order to facilitate a better understanding of the present invention.

Figure 1A:
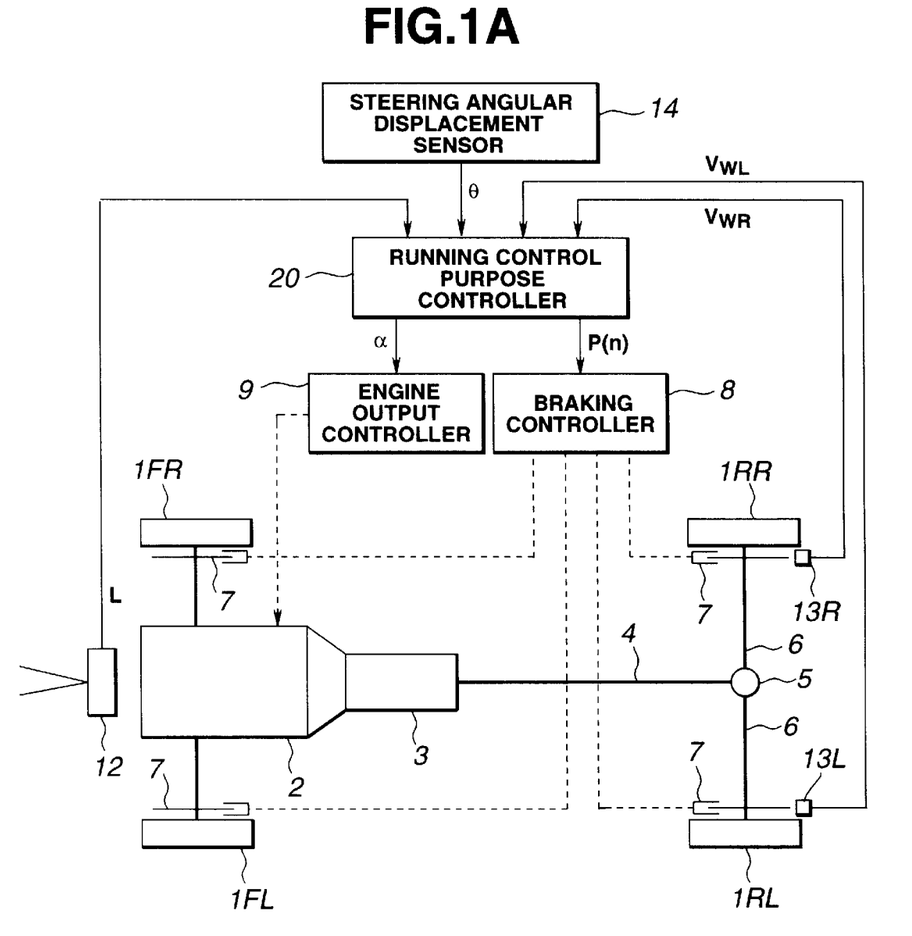
FIG. 1A is a schematic block diagram of an inter-vehicle distance controlling apparatus in a preferred embodiment according to the present invention.

FIG. 1A shows a schematic block diagram of an apparatus for controlling an inter-vehicle distance from a vehicle in which the apparatus is mounted to another vehicle traveling ahead of the vehicle in a preferred embodiment according to the present invention which is applicable to a rear-wheel-drive vehicle.

In FIG. 1A, 1FL and 1FR denote front left and right road wheels as undriven wheels and 1RL and 1RR denote rear left and right road wheels as drive wheels.

The rear left and right road wheels 1RL and 1RR are driven, a driving force of an engine 2 being transmitted via an automatic transmission 3, a propeller shaft 4, a final differential gear 5, and a wheel axle 6.

A disk brake 7 operatively generating a braking force is installed on each of the front left and right road wheels 1FL and 1FR and the rear left and right road wheels 1RL and 1RR, a braking oil pressure of each disk brake 7 being controlled by means of a braking controller 8.

The braking controller 8 generates the braking oil pressure in accordance with a depression depth (depression angle) of a brake pedal (not shown) and generates the braking oil pressure by decreasing the oil pressure in accordance with a pressure decrease command value from a vehicular running controller 20.

In addition, an engine output controller 9 which controls the output of the engine 2 is disposed. Methods to control the engine output may include a method for adjusting an opening angle of a throttle valve to control an engine speed and a method for adjusting an opening angle of an idling speed of the engine 2.

In the preferred embodiment, the engine output controller 9 adopts the method for adjusting the opening angle of the idling control valve.

An inter-vehicle distance sensor 12 is disposed on a front lower surface of a vehicle body to detect an inter-vehicle distance from the vehicle to the preceding vehicle. In addition, road wheel speed sensors 13L and 13R are disposed on the road wheels 1RL and 1RR to detect the road wheel velocities of the rear left and right road wheels 1RL and 1RR.

It is noted that the inter-vehicle distance sensor 12 is constituted by a laser radar unit which is exemplified by a U.S. Pat. No. 5,710,565 issued on Jan. 20, 1998, the disclosure of which is herein incorporated by reference. That is to say, the inter-vehicle distance detector includes the laser radar unit mounted on a predetermined front end of the vehicle for scanning a beam over a given scanning angle in a width-wise direction of the vehicle and receiving beams reflected from objects present within a forward detection zone defined by the scanning angle to detect the objects.

In addition, a steering angular displacement sensor 14 is disposed to detect a steering angular displacement on a steering wheel of the vehicle. In details, a disc-shaped plate having a plurality of slits on a peripheral end of the plate is attached onto a steering column associated with the steering wheel and a pair of photo sensors are faced toward the slits of the disc-shaped plate. Photo-electric converted signals of the pair of photo sensors when the steering wheel is operated indicate the steering angular displacement ($\theta$) and a phase difference therebetween indicates the steering angular direction.

Figure 1B:
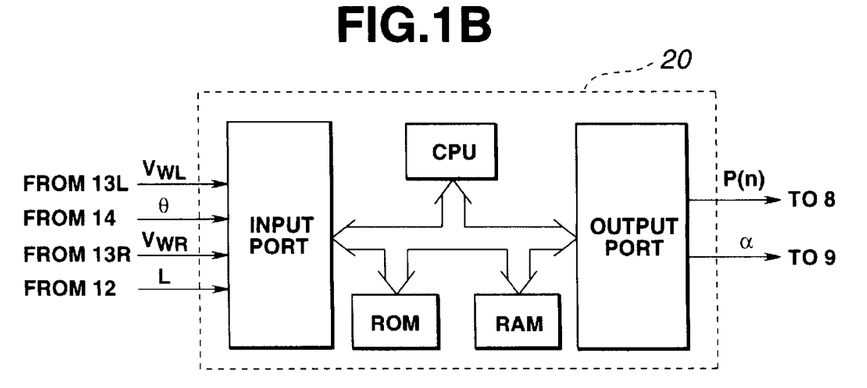
FIG. 1B is a block diagram of a vehicular running controller shown in FIGS. 1A and 1B.

Each output signal of the inter-vehicle distance sensor 12, the road wheel speed sensors 13L and 13R, and the steering angle sensor 14 is inputted to a vehicular running controller 20. FIG. 1B shows a detailed circuit block diagram of the vehicular running controller 20.

That is to say, the vehicular running controller 20 includes a microcomputer having a CPU (Central Processing Unit), an Input Port, an Output Port, ROM (Read Only Memory), a RAM (Random Access Memory), and a common bus.

The vehicular running controller 20 prescribes an operation of either or both of the braking controller 8 and the engine output controller 9 on the basis of the inter-vehicle distance L detected by means of the inter-vehicle distance sensor 12 and the road wheel velocities $V_{WL}$ and $V_{WR}$ detected by the respective road wheel speed sensors 13L and 13R so as to perform a follow-up running control to follow up a preceding vehicle running ahead of the vehicle maintaining an appropriate inter-vehicle distance to the preceding vehicle and so as to maintain the vehicle velocity immediately before a first state until the vehicle has passed the inter-vehicle distance immediately before the first state, the first state being such that during the follow-up running control, the preceding vehicle becomes out of the detection zone of the inter-vehicle distance sensor 12 and, thereafter, such a state that no preceding vehicle is in the detection zone of the inter-vehicle distance sensor 12 is continued.

Figure 2A:
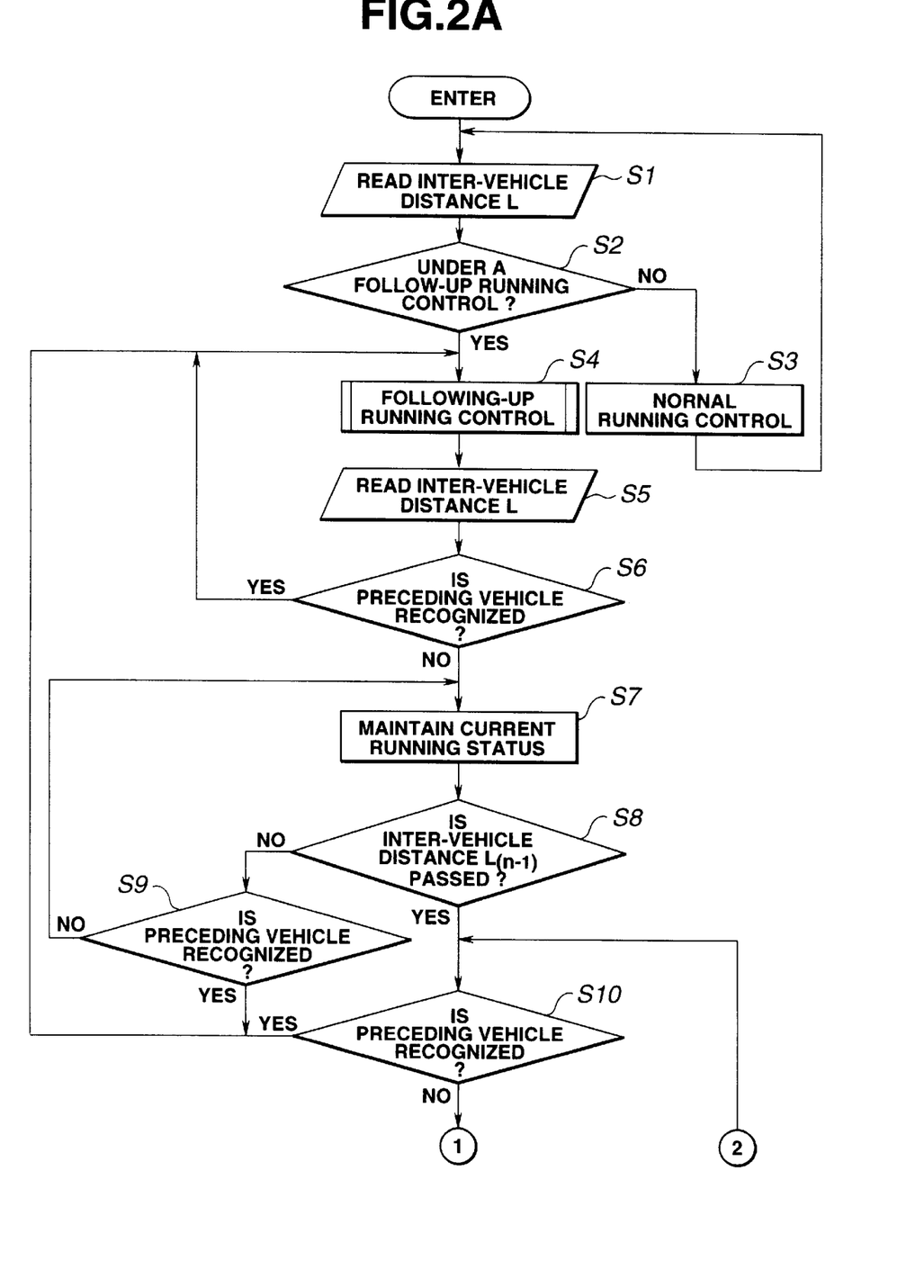
FIGS. 2A and 2B are integrally an operational flowchart for explaining a running control processing routine executed by the vehicular running controller shown in FIG. 1B.
Figure 2B:
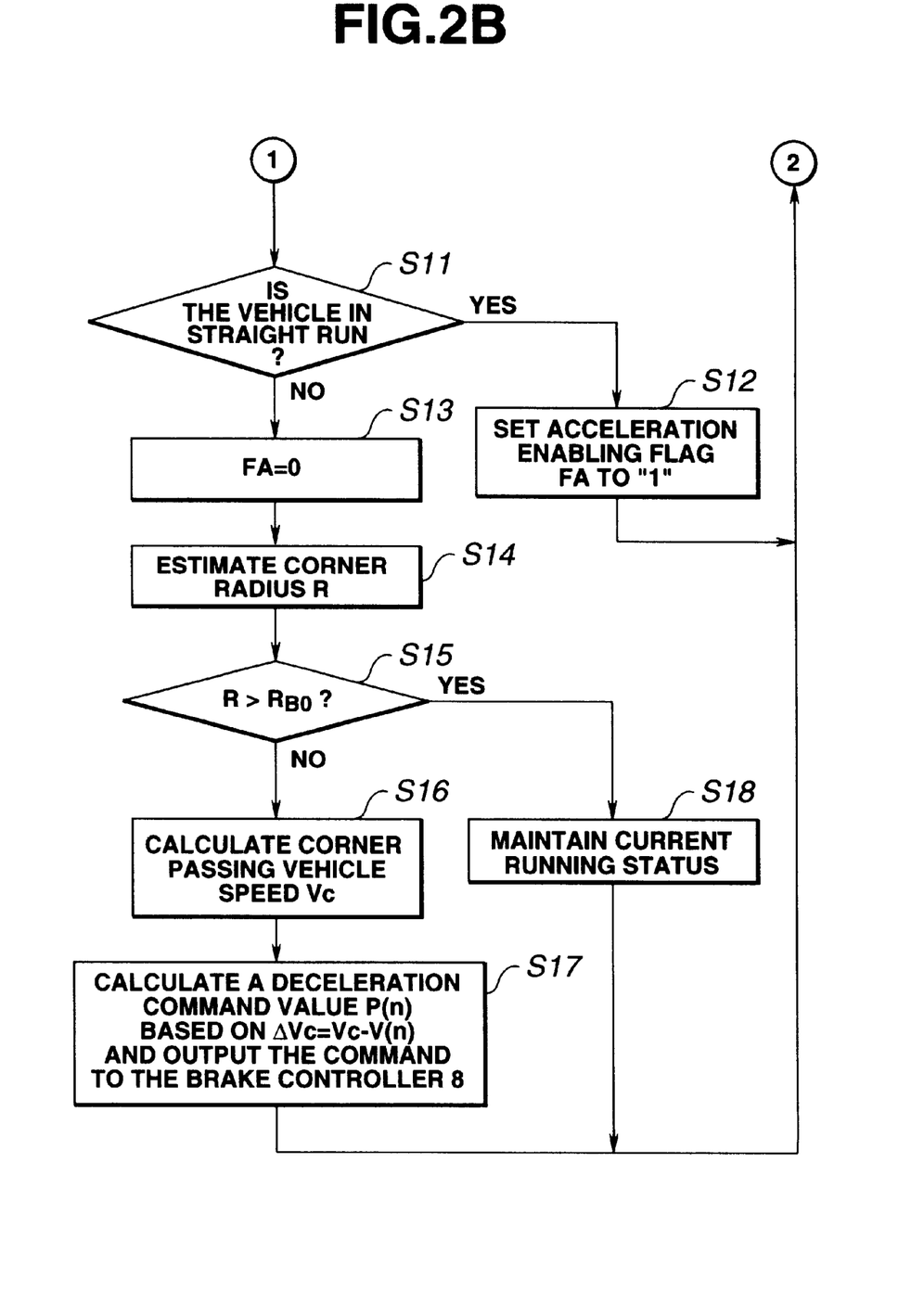

Next, FIGS. 2A and 2B integrally show a vehicular running processing routine executed in the vehicular running controller 20 for explaining an operation of the preferred embodiment according to the present invention.

In FIG. 2A, the CPU of the vehicular running controller 20 reads the inter-vehicle distance L detected by the inter-vehicle distance sensor 12 at a step S1.

At a step S2, the CPU of the vehicular running controller 20 determines whether the above-described follow-up running control should be carried out or not.

This determination is dependent upon whether the preceding vehicle is being detected by means of the inter-vehicle distance sensor 12.

That is to say, the CPU determines whether the inter-vehicle distance L detected by the inter-vehicle distance sensor 12 is equal to or below a preset inter-vehicle distance detection limit $L_{MAX}$.

If $L \geq L_{MAX}$ (NO) at the step S2, the CPU determines that no preceding vehicle is present within the inter-vehicle distance detection limit $L_{MAX}$ and it becomes impossible to perform the follow-up control and the routine goes to a step S3.

At the step S3, the CPU carries out a normal run of the vehicle, i.e., carries out a normal run of the vehicle, i.e., carries out an auto cruise run such that the vehicle cruises at a target constant vehicle velocity or carries out the running control according to an operation of the vehicle driver himself. Then, the routine returns to the step S1.

On the other hand, if $L < L_{MAX}$ at the step S2 (Yes), the CPU determines that it is possible to perform the follow-up running control (the presence of the preceding vehicle within the inter-vehicle detection limit $L_{MAX}$ executes the execution of the follow-up running control) and the routine goes to a step S4 in which the follow-up running control routine is carried out.

Figure 3:
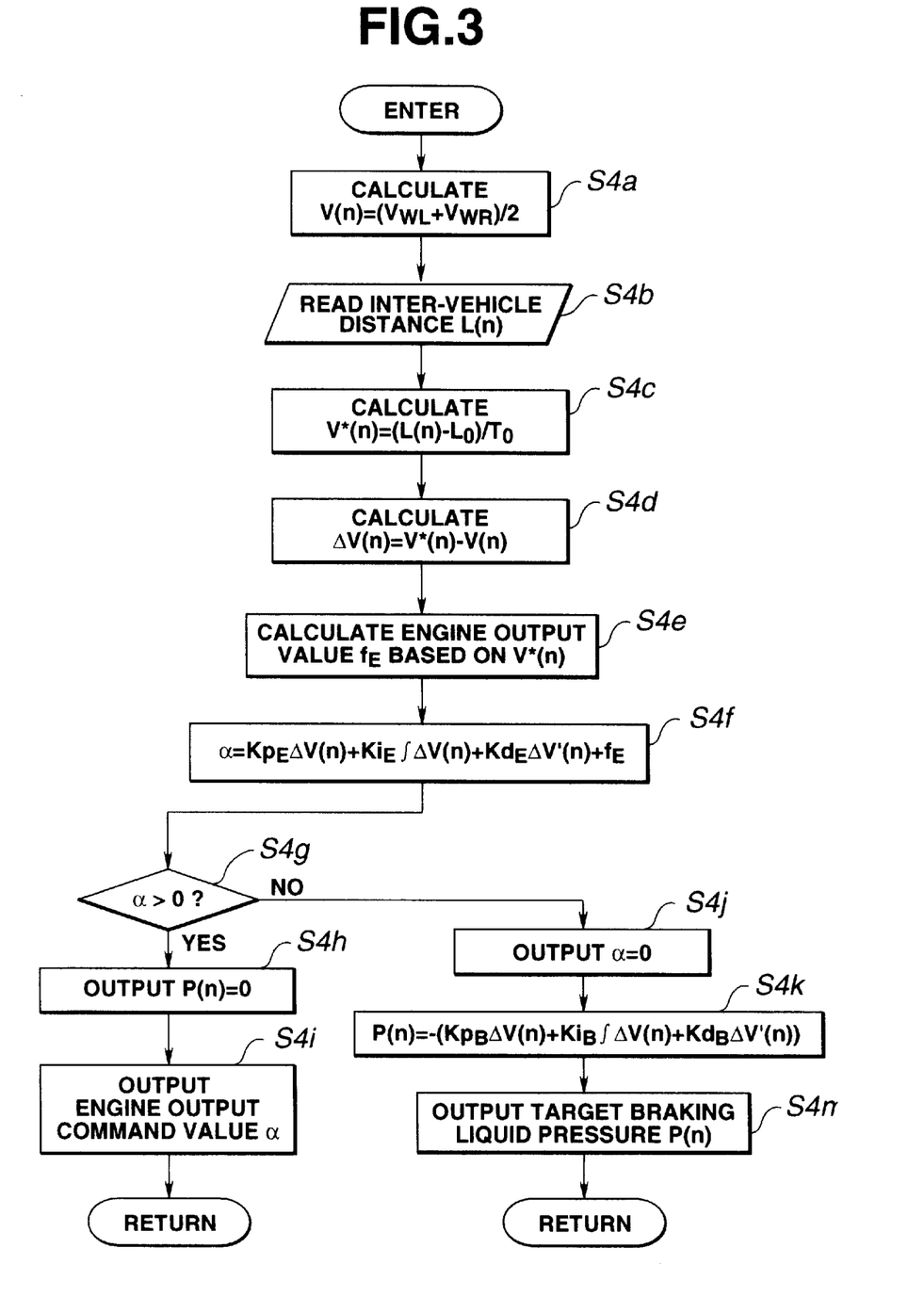
FIG. 3 is another operational flowchart for explaining a follow-up control routine at a step S4 of the flowchart shown in FIGS. 2A and 2B.

FIG. 3 shows the follow-up control sub-routine executed at the step S4.

As shown in FIG. 3, at a step S4a, the CPU of the vehicular running controller 20 calculates an average value of the road wheel velocities of $V_{WL}$ and $V_{WR}$ which is detected by the road wheel speed sensors 13L and 13R to determine the vehicle velocity V(n). It is noted that n denotes an arbitrary integer which is incremented by one whenever the step S4 is executed.

Next, the routine goes to a step S4b in which the CPU of the vehicular running controller 20 reads the inter-vehicle distance L(n) detected by the inter-vehicle distance sensor 12.

At the next step S4c, the CPU of the vehicular running controller 20 calculates the target vehicle velocity V*(n) from the inter-vehicle distance L(n) and the vehicle velocity V(n) so that a time duration $T_0$ (so-called, an inter-vehicle time duration) from a time at which the vehicle presently stands up to a time at which the vehicle reaches to a position behind $L_0$(n) of the preceding vehicle in accordance with the following equation (1) becomes constant.

$$V^*(n) = (L(n) - L_0)/T_0 \qquad (1).$$

By adopting a concept of the inter-vehicle time duration in the embodiment, the (target) inter-vehicle distance is set to become larger (longer) as the (target) vehicle velocity becomes faster.

Next, the routine goes to a step S4d in which the CPU of the vehicular running controller 20 calculates a velocity deviation $\Delta V$ (=V*(n)-V(n)) between the target vehicle velocity V*(n) and actual vehicle velocity V(n).

Figure 4:
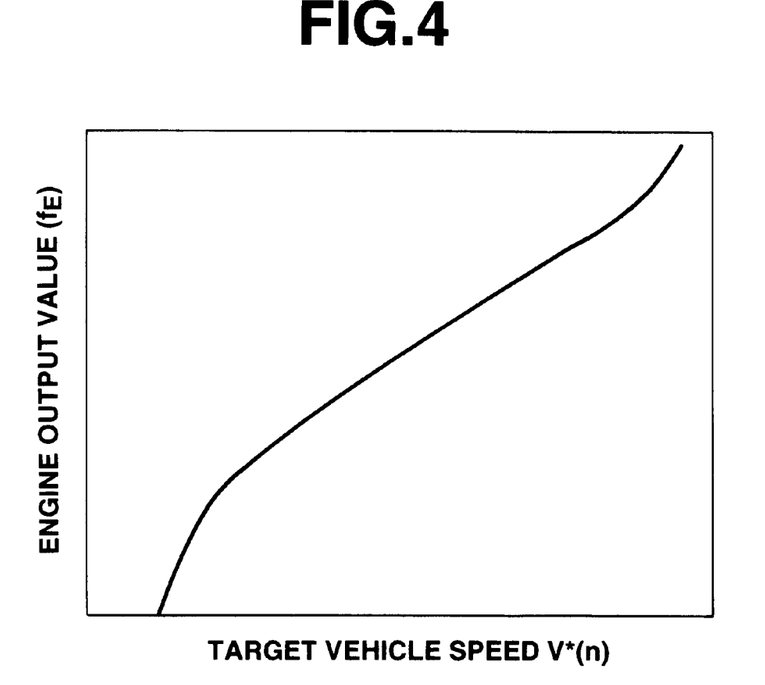
FIG. 4 is an explanatory view of a calculation map representing a relationship between a target vehicle velocity and an engine output value.

At the next step S4e, the CPU of the vehicular running controller 20 refers to an engine output value calculation map shown in FIG. 4 on the basis of the target vehicle velocity V*(n) and outputs the engine output value of $f_E$ corresponding to the target vehicle velocity V*(n).

At the next step S4f, the CPU of the vehicular running controller 20 calculates the following equation (2) on the basis of the velocity deviation $\Delta V$(n) and the engine output value $f_E$ and outputs an engine output command value $\alpha$ to the engine output controller 9.

$$\alpha = K_{PE}\Delta V(n) + K_{iE}\int \Delta V(n) + K_{dE}\Delta V'(n) + f_E. \qquad (2).$$

In the equation (2), $K_{PE}$ denotes a proportional gain, $K_{iE}$ denotes an integration gain, $K_{dE}$ denotes a differential gain, and $\Delta V'$ denotes a differential value of the velocity deviation $\Delta V$(n).

Then, the routine goes to a step S4g. At the step S4g, the CPU of the vehicular running controller 20 determines whether the calculated engine output command value $\alpha$ is positive.

If $\alpha > 0$ (Yes) at the step S4g, the routine goes to a step S4h in which a pressure decrease command value P(n) to direct the braking liquid pressure to be at "0" is outputted to the braking controller 8. At the next step S4i, the CPU of the vehicular running controller 20 outputs the engine output command value $\alpha$ to the engine output controller 9, the routine of FIG. 3 is ended, and is transferred to a step S5 in the vehicular running control procedure routine of FIG. 2A.

On the other hand, if $\alpha \leq 0$ at the step S4g (NO), the routine goes to a step S4j in which the CPU outputs the engine output command value $\alpha$ to the engine output controller 9 to indicate "0" (zero) output of the engine to the engine output controller 9 and the routine goes to a step S4k.

At the step S4k, the CPU of the vehicular running controller 20 performs the calculation of the equation (3) on the basis of the velocity deviation ($\Delta V$(n)) to derive a target braking liquid pressure (P(n)).

$$P(n) = -(K_{pB}\Delta V(n) + K_{iB}\int \Delta V(n) + K_{dB}\Delta V'(n)) \qquad (3),$$

wherein $K_{pB}$ denotes a proportional gain, $K_{iB}$ denotes an integration gain, and $\Delta V'$ denotes the differential value of the velocity deviation $\Delta V$(n).

Next, the present routine goes to a step S4m in which the calculated target braking liquid pressure P(n) is outputted to the braking controller 9, the processing of FIG. 3 is ended and the routine is transferred from that of FIG. 3 to the step S5 of FIG. 2A.

Referring back to the vehicular running control processing routine of FIGS. 2A and 2B, the follow-up control procedure of the step S4 is followed by the step S5 in which the CPU of the vehicular running controller 20 reads again the inter-vehicle distance sensor 12. Then, the routine goes to a step S6 in which the inter-vehicle distance sensor 12 detects the presence of the preceding vehicle for the CPU to determine whether the vehicle recognizes the presence of the preceding vehicle.

When the CPU of the controller 20 determines that the preceding vehicle is detected at the step S6 (Yes), the routine returns to the step S4. If the presence of the preceding vehicle is not detected at the step S6, the routine goes to a step S7.

At the step S7, the CPU of the controller 20 maintains the present running state in the follow-up control procedure immediately before the preceding vehicle becomes undetected, i.e., the current running state found during the execution of the steps S4 through S7.

Then, the routine goes to a step S8 in which the CPU of the controller 20 determines whether the vehicle has passed the inter-vehicle distance L(n−1) immediately before the preceding vehicle becomes undetected.

If not yet passed (NO) at the step S8, the routine goes to a step S9 in which the CPU of the controller 20 further determines whether the presence of preceding vehicle is recognized by the inter-vehicle distance sensor 12.

If recognized (Yes) at the step S9, the routine returns to the step S4. If not recognized (No) at the step S9, the routine returns to the step S7.

On the other hand, if the vehicle has passed the inter-vehicle distance L(n−1) (Yes) at the step S8, the routine goes to a step S10.

At the step S10, the CPU of the controller 20 determines whether the CPU itself recognizes whether the presence of the preceding vehicle through the inter-vehicle distance sensor 12 in the same manner as described at the step S6 and the step S9.

If recognized (Yes) at the step S10, the routine returns to the step S4.

If not recognized (No) at the step S10, the routine is advanced to a step S11 in which a recognition as will be described below occurs.

At the step S11, the CPU of the controller 20 determines whether the vehicle is in the straight run or not.

This determination is based on the following sequence; that is to say, reading the steering angular displacement (θ), which is equal to or below a present relatively small threshold value (θso).

If $\theta \leq \theta_{SO}$ (Yes) at the step S11, the CPU of the controller 20 determines that the vehicle is running straight and the routine goes to a step S12. When, for example, the vehicle performs the auto cruise control, the CPU of the controller 20 sets an acceleration enabling flag FA enabling or allowing the vehicle to be accelerated to "1" and the routine returns to a step S10.

If θ>θS0 (No) at the step S11, the CPU of the controller 20 determines that the vehicle is turning at either of a left or right direction (the vehicle is running on a curved road) and the routine goes to a step S13.

At the step S13, the CPU of the controller 20 resets the acceleration enabling flag FA to a "0".

At the next step S14, the CPU of the controller 20 estimates a turning radius of a corner, i.e., a turning radius R of the vehicle passing on the basis of the present vehicle velocity V(n) and the steering angular displacement (θ) of the steering angular displacement sensor 14.

Then, the routine goes to a step S15 in which the CPU of the controller 20 determines whether the radius of turn R is in excess of a braking required radius of turn $R_{B0}$.

Figure 5:
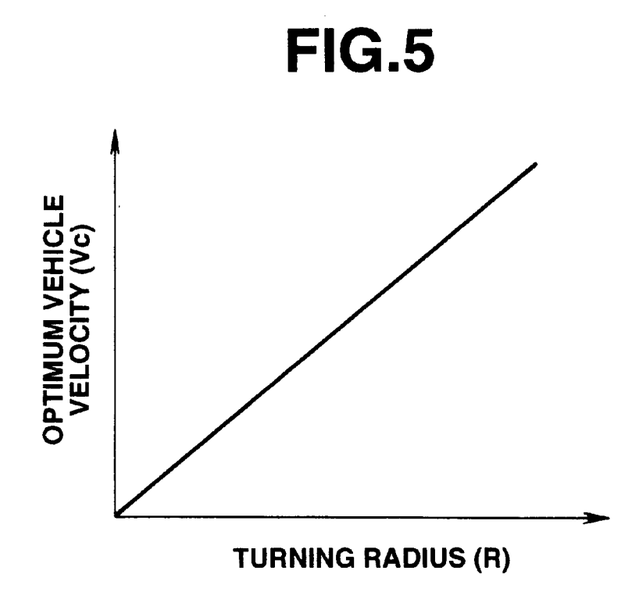
FIG. 5 is an explanatory view of another calculation map representing a relationship between a radius of turn and its corresponding optimum velocity.

If $R \leq R_{B0}$ at the step S15 (No), the CPU of the controller 20 determines that the radius of turn on the corner during the passing of the vehicle and the routine goes to a step S16. At the step S16, the CPU of the controller 20 refers to a calculated map (an array) of FIG. 5 representing a relationship between the turn of radius (R) shown in FIG. 5 and an optimum vehicle velocity (Vc) when the vehicle runs on the turn of radius R, derives the optimum vehicle velocity Vc in accordance with the turn of radius. Then, the routine goes to a step S17. At the step S17, the CPU of the controller 20 calculates the target braking liquid pressure P(n) in the same way as in the equation (3) on the basis of the deviation ΔVc between the optimum vehicle velocity Vc and the present vehicle velocity V(n). The calculated target braking liquid pressure P(n) is outputted to the braking controller 8. And, the routine returns to the step S10.

On the other hand, if R>$R_{B0}$ (Yes) at the step S15, the routine goes to a step S18 in which after the present running condition is maintained, the routine returns to the step S10.

Hence, suppose now that the vehicle is running straight and no preceding vehicle running ahead of the vehicle is present. In this case, the inter-vehicle distance L detected by the inter-vehicle distance sensor 12 indicates infinite and is in excess of the detection limit value $L_{MAX}$.

Hence, in the running control processing of FIGS. 2A and 2B, the routine advances from the step S2 to the step S3 in which the vehicular run is in the normal mode of the operation (manuever) by the driver himself or in the auto cruise run mode in which the vehicle cruises at the set vehicle speed when the auto cruise control mode is selected.

If, during the control loop of the steps S1→S2→S3→S1, the read inter-vehicle distance L indicates the value of the inter-vehicle distance which is shorter than the detection limit value $L_{MAX}$, the routine of FIGS. 2A and 2B goes from the step S2 to the step S4 in which the vehicle is in the preceding vehicle follow-up run control state.

That is to say, the follow-up run control processing shown in FIG. 3 is executed.

In details, during the execution of the follow-up run control, the CPU of the controller 20 calculates the target vehicular velocity V*(n) to maintain the inter-vehicle distance according to the instantaneous vehicle velocity, calculates the engine output value $f_E$ on the basis of the velocity deviation ΔV(n) between the target vehicle velocity V*(n) and the actual vehicle velocity V(n), and calculates the engine output command value α in accordance with the equation (2) based on the engine output value $f_E$ and the velocity deviation ΔV(n). If the engine output command value α is positive, the CPU of the controller 20 determines that the inter-vehicle distance is too long and outputs the engine output command value α to the engine output controller 9 for the vehicle to be controlled in the acceleration state.

On the contrary, if the engine output command value α is negative, the CPU of the controller 20 determines that the inter-vehicle distance is too narrow (too short) and calculates the target braking liquid pressure P(n) in accordance with the equation (3) on the basis of the velocity deviation ΔV(n) and outputs the calculated target braking liquid pressure to the braking controller 8 for the vehicle to be in the deceleration state.

If, under the preceding vehicle follow-up control state, for example, the preceding vehicle is passing such a corner that the radius of turn R is relatively small so that the inter-vehicle distance sensor 12 cannot recognize the presence of the preceding vehicle, the routine goes from the step S6 to the step S7 in which the present vehicular running state is maintained without controls over the vehicular acceleration and deceleration.

Then, the CPU of the controller 20 determines whether the vehicle has run by the distance corresponding to the inter-vehicle distance L(n−1) immediately before the recognition of the preceding vehicle cannot be made.

If the vehicle does not pass the inter-vehicle distance L(n−1) immediately before the above-described event occurs, the routine goes to the step S9 in which the CPU of the controller 20 determines whether the preceding vehicle is newly recognized again through the inter-vehicle distance sensor 12.

If the preceding vehicle can be recognized, the routine returns to the follow-up run control procedure at the step S4.

If the preceding vehicle cannot be recognized, the present running state of the vehicle is maintained until the above-described inter-vehicle distance L(n−1) has been passed.

Upon the passage of the vehicle by the inter-vehicle distance L(n−1) which is immediately before the preceding vehicle is out of the recognizable range of detection due to the passage of the preceding vehicle through the small radius of turn (R), the routine goes to the step S10 in which the controller 20 determines whether the vehicle has again recognized the preceding vehicle.

If not recognized, the CPU of the controller 20 determines whether the vehicle runs straight or not run on the basis of the steering angular displacement θ detected by the steering angular displacement sensor 14.

At this time, if the vehicle is running straight or running at a corner having a large radius of turn approximate to the straight run, the CPU of the controller 20 determines that it is assured that the preceding vehicle is not present. Then, the routine goes to the step S12 in which the acceleration enabling flag FA is set to "1" to enable the acceleration of the vehicle in the auto cruise control or so forth.

If the CPU of the controller 20 determines that the vehicle is continued in the turning state, the acceleration enabling flag FA is reset to "0" to inhibit the acceleration process for the vehicle in the auto cruise control or so forth from being activated and the radius of turn R of the vehicle is estimated from the vehicle velocity V(n) and the steering angular displacement θ.

Then, the CPU of the controller 20 determines whether the estimated radius of turn R is larger than the braking required radius of turn $R_{BO}$.

If the radius of turn R is equal to or smaller than the braking required radius $R_{BO}$, the routine goes to the steps S16 and S17 in which the CPU of the controller 20 calculates the optimum vehicle velocity Vc most suitable to run through the radius of turn R of the vehicle, calculates the target braking liquid pressure P(n) on the basis of the velocity deviation ΔVc between the optimum velocity V(n), and outputs the target braking liquid pressure P(n) to the braking controller 8 for the vehicle to be braked to enable the stable cornering maneuver.

It is noted that when, during the above-described straight run or cornering maneuver, the preceding vehicle is recognized, the routine returns to the step S4 in which the vehicle is returned to the preceding vehicle follow-up run state.

As described in the preferred embodiment, when the vehicle recognizes the preceding vehicle and is in the follow-up run control state in which the vehicle follows up the preceding vehicle, maintaining at the predetermined inter-vehicle distance to the preceding vehicle and when the preceding vehicle passes the corner having the small radius of turn R so as not to enable the recognition of the preceding vehicle through the inter-vehicle distance sensor 12, the vehicle maintains the running state in the preceding vehicle follow-up run controlled state without acceleration or deceleration until the vehicle passes the inter-vehicle distance L(n−1) which is immediately before the inter-vehicle distance sensor 12 cannot recognize the presence of the preceding vehicle. It is noted that the sentence that the inter-vehicle distance sensor 12 cannot recognize the presence of the preceding vehicle does not mean that the inter-vehicle distance sensor 12 becomes abnormal due to its failure.

Consequently, the apparatus in the preferred embodiment can prevent positively from giving such a feeling of difference to the vehicle driver that in spite of the cornering maneuver of the vehicle, the vehicle is accelerated.

In addition, when the preceding vehicle performs the lane change so that the inter-vehicle distance to the preceding vehicle cannot be measured by the inter-vehicle distance sensor 12, the vehicle maintains the present running state in the same way as described above until the vehicle passes the inter-vehicle distance L(n−1). At a time point when the vehicle has passed the inter-vehicle distance L(n−1), the acceleration enabling flag FA is set to "1" immediately when the vehicle runs straight or on the corner having the large radius of turn, the CPU of the controller 20 can allow the acceleration request through the operation by the vehicle driver or through the auto cruise control and the vehicle can be transferred to be the acceleration state.

The same is equally applied to the case where the vehicle itself performs the lane change.

In the preferred embodiment, the present run state is maintained until the vehicle has passed a traffic lane by the inter-vehicle distance L(n−1) immediately before the inter-vehicle distance sensor cannot recognize the preceding vehicle during the follow-up run controlled state.

However, the present running state may be maintained until it has taken the inter-vehicle time duration $T_0$ corresponding to the inter-vehicle distance L(n−1) described above.

In the preferred embodiment, the target vehicle velocity V*(n) is determined during the follow-up running control so that the time (inter-vehicle time duration) $T_0$ up to which the vehicle has arrived at the distance $L_0$(m) behind the preceding vehicle on the basis of the inter-vehicle distance L(m) becomes constant and, on the basis of the target vehicle velocity V*(n), the engine output command value α is calculated.

However, in the preferred embodiment, the determination of whether the vehicle runs straight or turns through the radius of turn is based on the steering angular displacement θ detected by the steering angular displacement sensor 14. However, the vehicular running state may be determined on the basis of a detected value of a yaw rate sensor or of a lateral acceleration (G) sensor.

Furthermore, in the preferred embodiment, the radius of turn R in the corner is estimated on the basis of the vehicle velocity V(n) and the steering angular displacement θ. However, this radius of turn R may be estimated on the basis of the present vehicle velocity V(n) and the yaw rate detected by the yaw rate sensor or the lateral acceleration detected value by the lateral acceleration (G) sensor.

Furthermore, in the preferred embodiment, in the preceding vehicle follow-up control processing, the engine output command value α and the target braking liquid pressure P(n) are calculated.

However, in order to maintain the actual inter-vehicle distance at the target inter-vehicle distance, the deceleration may be calculated on the basis of the deviation between the target inter-vehicle distance and the actual inter-vehicle distance when the target inter-vehicle distance is larger than the actual inter-vehicle distance, the acceleration may be calculated on the basis of the deviation between the target inter-vehicle distance which is, for example, for the auto cruise control when the target inter-vehicle distance is smaller than the actual inter-vehicle distance, and may be outputted to the braking controller and the engine output controller.

Although, in the preferred embodiment, the present invention is applicable to the rear-wheel-drive vehicle (FR vehicle), the present invention is also applicable to a front-wheel-drive vehicle (FF vehicle) or to a four-wheel-drive vehicle (4WD).

Furthermore, the present invention is applicable to an electric car in which an electric motor is applied as a prime mover of the vehicle in place of the engine 2 or to a hybrid car in which the motor is used in addition to the engine 2 as the prime movers. In this case, in place of the engine output controller, an electric motor controller is used.

It is noted that the auto cruise control system is exemplified by a U.S. Pat. No. 5,127,487 issued on Jul. 7, 1992, the disclosure of which is herein incorporated by reference.

It is also noted that, although, in the routine of FIG. 2A, the step S7 is directly transferred from the step S6 when the CPU of the controller 20 does not recognize the presence of the preceding vehicle, a time measuring step for measuring a time duration for which the state in which the preceding vehicle becomes indetectable is continued may be interposed at the junction between the steps S9, S6, and S7. This time duration may be fixed (for example, several seconds) or may be varied.

It is also noted that a vehicular velocity variation inhibit command includes a vehicular acceleration inhibit command and corresponds to the series of the steps S5 through S9 in the routine shown in FIGS. 2A and 2B.

What is claimed is:

1. A control apparatus for an automotive vehicle, comprising:
    an inter-vehicle distance detector for detecting an inter-vehicle distance from a host vehicle to a preceding vehicle which is running on a traffic lane;
    a vehicular running controller for performing a follow-up running control for the host vehicle such that the host vehicle runs behind the preceding vehicle, maintaining a predetermined inter-vehicle distance to the preceding vehicle; and
    a vehicular velocity variation inhibit command generator for generating and outputting a vehicular velocity variation inhibit command to the vehicular running controller to maintain a vehicular running state immediately before the inter-vehicle distance detector changes from a first state in which the inter-vehicle distance to the preceding vehicle is being detected into a second state in which the inter-vehicle distance becomes indetectable, and the vehicular velocity variation inhibit command is continued for a duration of time until the host vehicle passes the traffic lane by the inter-vehicle distance immediately before the inter-vehicle distance detector changes from the first state into the second state.

2. A control apparatus for an automotive vehicle as claimed in claim 1, wherein the vehicular running controller recovers follow-up running control when the vehicular velocity variation inhibit command is received from the vehicular velocity variation inhibit command generator and when the inter-vehicle distance detector becomes detectable for a presence of the preceding running vehicle before the host vehicle has passed the traffic lane by the inter-vehicle distance which is immediately before the inter-vehicle distance detector changes from the first state into the second state.

3. A control apparatus for an automotive vehicle as claimed in claim 1, wherein the vehicular running controller includes a vehicular running state detector for detecting whether the vehicle is in a straight running state or in a turning state and wherein the vehicular running controller is in a vehicular acceleration control enabled state to enable the host vehicle to be accelerated when the following condition is satisfied:
    at a time point at which the host vehicle has passed the traffic lane by the inter-vehicle distance which is immediately before the inter-vehicle distance detector changes from the first state into the second state from a time at which the vehicular velocity variation inhibit command is received from the vehicular velocity variation inhibit command generator, the inter-vehicle distance detector is indetectable for a presence of the preceding vehicle and the vehicular running state detector detects that the host vehicle is in the straight running state.

4. A control apparatus for an automotive vehicle as claimed in claim 1, wherein the vehicular running controller includes:
    a vehicular running state detector for detecting whether the host vehicle is in a straight running state or in a turning state;
    a turning radius estimator for estimating a radius of turn of the host vehicle on a basis of a result of detection by the vehicular running state detector; and
    a first setter for setting a vehicular running state in accordance with the estimated turning radius of the host vehicle when the inter-vehicle distance detector is indetectable for the presence of the preceding vehicle and the vehicular running state detector detects that the host vehicle is running in the turning state at a time point at which the host vehicle has passed the traffic lane by the inter-vehicle distance which is immediately before the inter-vehicle distance detector changes from the first state into the second state from a time at which the vehicular velocity variation inhibit command is received from the vehicular velocity variation inhibit command generator.

5. A control apparatus for an automotive vehicle as claimed in claim 4, wherein the vehicular running controller includes:
    a first determinator for determining whether the estimated turning radius of the host vehicle is equal to or below a deceleration required radius of turn equal to or below which the host vehicle is required to decelerate the host vehicle; and
    a second setter for setting the host vehicle in a deceleration control enabled state to enable the host vehicle to be decelerated when the first determinator determines that the estimated radius of turn is equal to or below the deceleration required radius of turn.

6. A control apparatus for an automotive vehicle as claimed in claim 5, wherein the first setter sets the vehicular running controller in an acceleration control enabled state to enable the host vehicle to be accelerated when the estimated turning radius of the host vehicle is in excess of an acceleration enabling radius of turn which is larger than the deceleration required radius of turn.

7. A control apparatus for an automotive vehicle as claimed in claim 6, wherein the inter-vehicle distance detector comprises a radar unit mounted on a predetermined front end of the host vehicle for scanning a beam over a given scanning angle in a width-wise direction of the host vehicle and receiving beams reflected from at least one object present within a forward detection zone defined by the scanning angle to detect the object.

8. A control apparatus for an automotive vehicle as claimed in claim 6, which further comprises a vehicle velocity detector for detecting a present velocity (Vn) of the host vehicle and wherein the vehicular running controller reads the present inter-vehicle distance (L(n)) from the inter-vehicle distance detector and includes a first calculator for calculating a target vehicle velocity (V*(n)) so that a time duration ($T_0$) during which the host vehicle has reached to a position ($L_0$) behind the preceding vehicle running ahead of the host vehicle becomes constant in accordance with the following equation: $V^*(n) \times (L(n)-L_0)/T_0$.

9. A control apparatus for an automotive vehicle as claimed in claim 8, wherein the vehicular running controller further includes:
- a second calculator for calculating a velocity deviation ($\Delta V(=V^*(n)-V(n))$) between the target vehicle velocity and the present vehicle velocity; and
- a third calculator for calculating an engine output command value ($\alpha$) in accordance with the following equation: $\alpha = K_{PE}\Delta V(n) + K_{iE}\int \Delta V(n) + K_{dE}\Delta V'(n) + f_E$, wherein $K_{PE}$ denotes a proportional gain, $K_{iE}$ denotes an integration gain, $K_{dE}$ denotes a differential gain, $\Delta V'$ denotes a differential value of $\Delta V(n)$, and $f_E$ denotes an engine output value corresponding to the calculated target vehicle velocity $V^*(n)$.

10. A control apparatus for an automotive vehicle as claimed in claim 9, wherein the vehicular running controller further includes:
- a second determinator for determining whether the engine output command value ($\alpha$) is positive or not; and
- a fourth calculator for calculating a target braking liquid pressure (P(n)) in accordance with the following equation when $\alpha \leq 0$:
  $P(n) = -(K_{PB\Delta V(n)+KiB}\int \Delta V(n) + K_{dB}\Delta V'(n))$, wherein $K_{PB}$ denotes a proportional gain, $K_{iB}$ denotes an integration gain, and $K_{dB}$ denotes a differential gain.

11. A control apparatus for an automotive vehicle as claimed in claim 10, wherein the vehicular running controller further includes:
- a second reader for reading the detected inter-vehicle distance (L) from the inter-vehicle distance detector; and
- a third determinator for determining whether the presence of the preceding vehicle running ahead of the host vehicle is recognized by the inter-vehicle distance detector according to whether the detected inter-vehicle distance (L) is within a detection limit value ($L_{max}$) of the inter-vehicle distance detector and wherein the vehicle running controller maintains the present vehicular running state immediately before the third determinator determines that the presence of the preceding vehicle is not recognized.

12. A control apparatus for an automotive vehicle as claimed in claim 11, wherein the vehicular running controller further includes:
- a fourth determinator for determining whether the host vehicle has passed the traffic lane by the inter-vehicle distance (L(n-1)) which is immediately before the inter-vehicle distance detector detects that no preceding vehicle is present and wherein the third determinator becomes active again when the fourth determinator determines that the host vehicle has passed the traffic lane by the immediately before inter-vehicle distance (L(n-1)).

13. A control apparatus for an automotive vehicle as claimed in claim 12, wherein the vehicular running state detector includes:
- a steering angular displacement sensor for detecting a steering angular displacement ($\theta$) of a steering wheel of the host vehicle; and
- a fifth determinator for determining whether the steering angular displacement is equal to or below a predetermined small threshold value ($\theta$so) so as to determine whether the host vehicle is in the straight running state or in the turning state.

14. A control apparatus for an automotive vehicle as claimed in claim 13, wherein the estimator estimates the turning radius (R) of the host vehicle on the basis of the present vehicle velocity (V(n)) and the steering angular displacement ($\theta$) when the fifth determinator determines that the steering angular displacement ($\theta$) is above the predetermined small threshold value ($\theta > \theta$so).

15. A control apparatus for an automotive vehicle as claimed in claim 14, wherein the vehicular running controller includes an acceleration enabling flag (FA) which is set so as to enable the host vehicle to be accelerated when the steering angular displacement ($\theta$) is equal to or below the predetermined small threshold value ($\theta \leq \theta$).

16. A control apparatus for an automotive vehicle as claimed in claim 15, wherein the vehicular running controller includes:
- a sixth determinator for determining whether the estimated radius of turn of the host vehicle (R) is in excess of the braking required radius of turn of the vehicle ($R_{BO}$);
- a fifth calculator for calculating an optimum vehicle velocity (Vc) according to the estimated radius of turn of the host vehicle (R) when $R \leq R_{BO}$; and
- a sixth calculator for calculating the target braking liquid pressure (P(n)) on the basis of a deviation ($\Delta Vc$) between the optimum vehicle velocity (Vc) and the present vehicle velocity (V(n)) when $R \leq R_{BO}$.

17. A control apparatus for an automotive vehicle as claimed in claim 16, wherein when $R > R_{BO}$, the vehicular running controller is operated to maintain the present vehicular running state.

18. A control apparatus for an automotive vehicle as claimed in claim 17, wherein when $\alpha \leq 0$, the vehicular running controller outputs a zero engine output command value ($\alpha$) to an engine output controller and calculates and outputs the present braking liquid pressure (P(n)) based on the velocity deviation ($\Delta V(n)$) to a braking controller so that the host vehicle is decelerated and wherein when $\alpha > 0$, the vehicular running controller outputs a zero target braking liquid pressure (P(n)=0) to the braking controller and the engine output command value ($\alpha$) to the engine output controller.

19. A control apparatus for an automotive vehicle, comprising:
- inter-vehicle distance detecting means for detecting an inter-vehicle distance from a host vehicle to a preceding vehicle which is running on a traffic lane at the detected inter-vehicle distance from the host vehicle;
- vehicular running controlling means for performing a follow-up running control for the host vehicle such that the host vehicle runs behind the preceding vehicle, maintaining a predetermined inter-vehicle distance to the preceding vehicle; and vehicular velocity variation inhibit command generating means for generating and outputting a vehicular velocity variation inhibit command to the vehicular running controlling means to maintain a vehicular running state immediately before the inter-vehicle distance detecting means changes from a first state in which the inter-vehicle distance to the preceding vehicle is being detected into a second state in which the inter-vehicle distance becomes indetectable, and the vehicular velocity variation inhibit command is continued for a duration of time until the host vehicle passes the traffic lane by the inter-vehicle distance immediately before the inter-vehicle distance detecting means changes from the first state into the second state.

20. A control method for an automotive vehicle, comprising the steps of:

detecting an inter-vehicle distance from a host vehicle to a preceding vehicle which is running on a traffic lane at the detected inter-vehicle distance from the host vehicle through an inter-vehicle distance detector;

performing a follow-up running control for the host vehicle such that the host vehicle runs behind the preceding vehicle, maintaining a predetermined inter-vehicle distance to the preceding vehicle; and generating a vehicular velocity variation inhibit command to maintain a vehicular running state immediately before the inter-vehicle distance detector changes from a first state in which the inter-vehicle distance to the preceding vehicle is being detected into a second state in which the inter-vehicle distance becomes indetectable, and the vehicular velocity variation inhibit command is continued for a duration of time until the host vehicle passes the traffic lane by the inter-vehicle distance immediately before the inter-vehicle distance detector changes from the first state into the second state.

* * * * *